United States Patent [19]

Taylor

[11] Patent Number: 4,549,569
[45] Date of Patent: Oct. 29, 1985

[54] LOCKING VALVE CONSTRUCTION

[75] Inventor: John H. Taylor, Orchard Park, N.Y.

[73] Assignee: McGard, Inc., Buffalo, N.Y.

[21] Appl. No.: 656,486

[22] Filed: Oct. 1, 1984

Related U.S. Application Data

[62] Division of Ser. No. 370,355, Apr. 21, 1982, Pat. No. 4,495,910.

[51] Int. Cl.$^4$ .............................................. F16K 27/08
[52] U.S. Cl. .................................. 137/382.5; 251/292; 251/297; 251/310; 251/367
[58] Field of Search ................... 137/382, 382.5, 797; 251/148, 292, 297, 310, 356, 363, 367

[56] References Cited

U.S. PATENT DOCUMENTS

| 753,349 | 3/1904 | Bacon | 137/385 |
|---|---|---|---|
| 1,172,464 | 2/1916 | Kellum | 251/310 |
| 1,329,943 | 2/1920 | Weller et al. | |
| 1,475,275 | 11/1923 | Bowman et al. | |
| 3,241,408 | 3/1966 | McCauley | 81/71 |
| 3,430,658 | 3/1969 | Self | 251/297 |
| 3,630,306 | 12/1971 | Shur | 180/114 |
| 3,682,267 | 8/1972 | Kayser | 180/114 |
| 3,782,862 | 1/1974 | Cammi | 417/313 |
| 3,919,868 | 11/1975 | Lipschutz | 70/239 |
| 3,949,581 | 4/1976 | Toyama | 70/239 |
| 4,044,744 | 8/1977 | Keefer | 123/136 |
| 4,058,289 | 11/1977 | Hicks | 251/310 |
| 4,061,158 | 12/1977 | Musial | 251/297 |
| 4,119,171 | 10/1978 | Remontet | 180/114 |
| 4,131,127 | 12/1978 | Ferro et al. | 137/384.6 |
| 4,140,337 | 2/1979 | Arcella et al. | 285/355 |
| 4,209,000 | 6/1980 | Ivie | 123/198 DB |
| 4,426,983 | 1/1984 | Seilly et al. | 123/506 |
| 4,463,777 | 8/1984 | Taniguthi et al. | 137/797 |

Primary Examiner—A. Michael Chambers
Assistant Examiner—Sheri Novack
Attorney, Agent, or Firm—Joseph P. Gastel

[57] ABSTRACT

A locking valve construction including a housing, a valve member in the housing, a fluid inlet and a fluid outlet in the housing, a valve member rotating key for rotating the valve member to an open position for selectively effecting communication between the fluid inlet and the fluid outlet, a holding member effectively mounted on the housing for holding the housing against rotation relative to a base when the valve member is being rotated by the valve member rotating key, and mounting structure for mounting the housing on the base for permitting the housing and the valve member to rotate as a unit in the event that the holding member is rendered inoperative to thereby prevent movement of the valve member relative to the housing to an open position.

19 Claims, 20 Drawing Figures

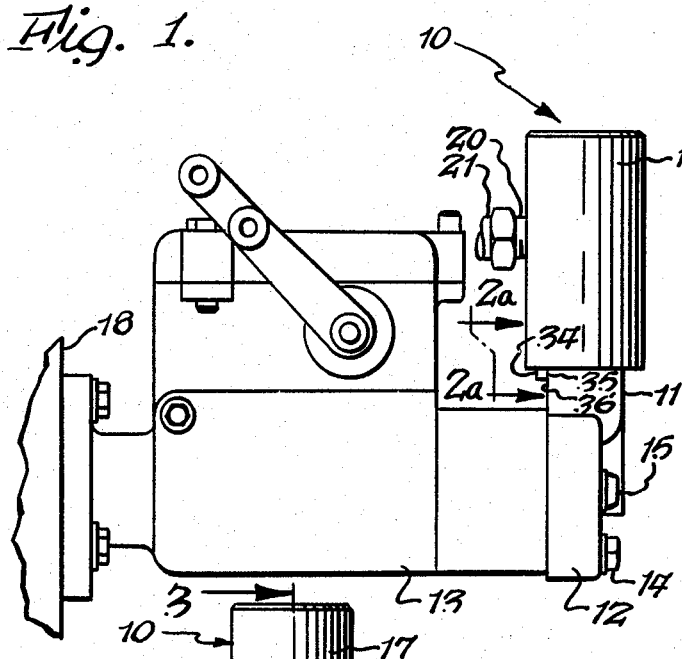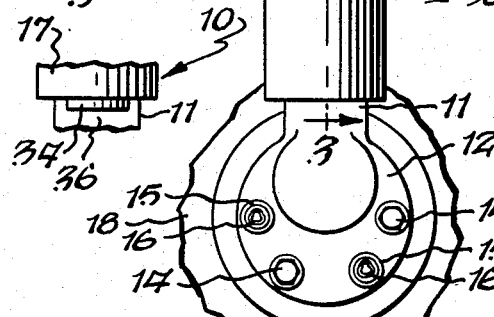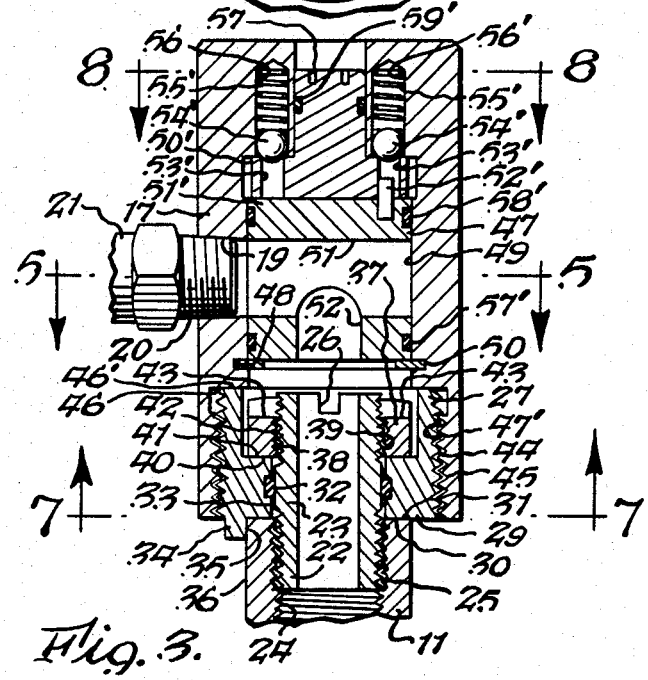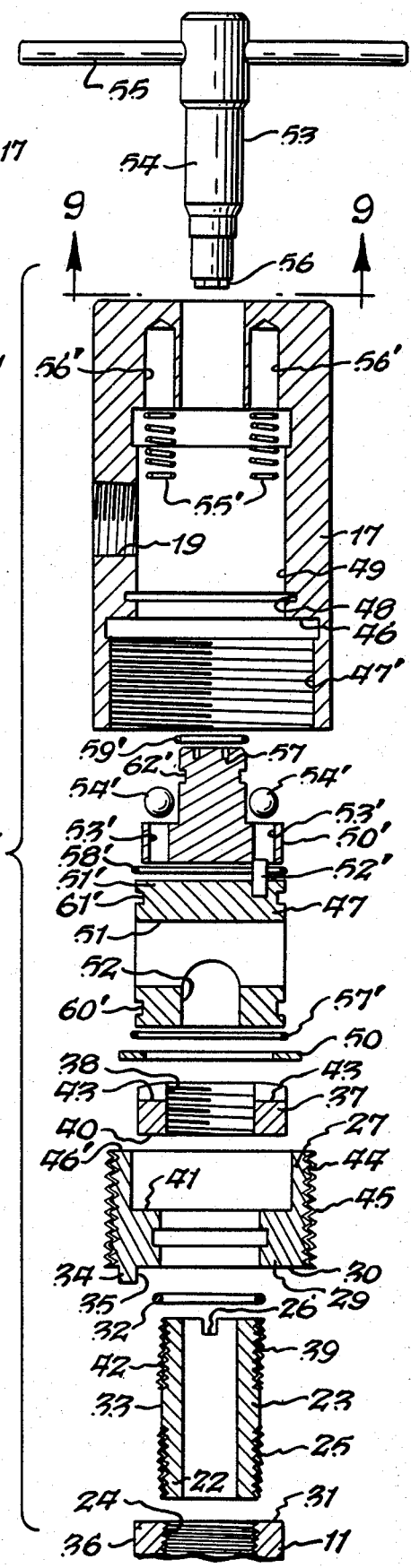

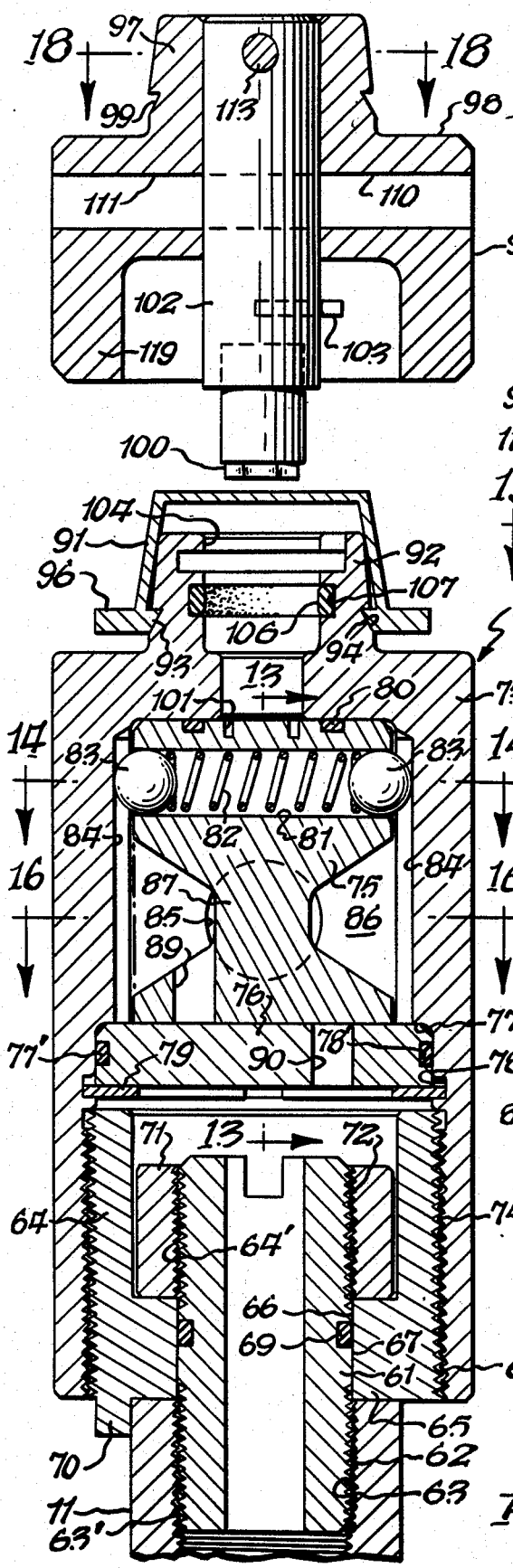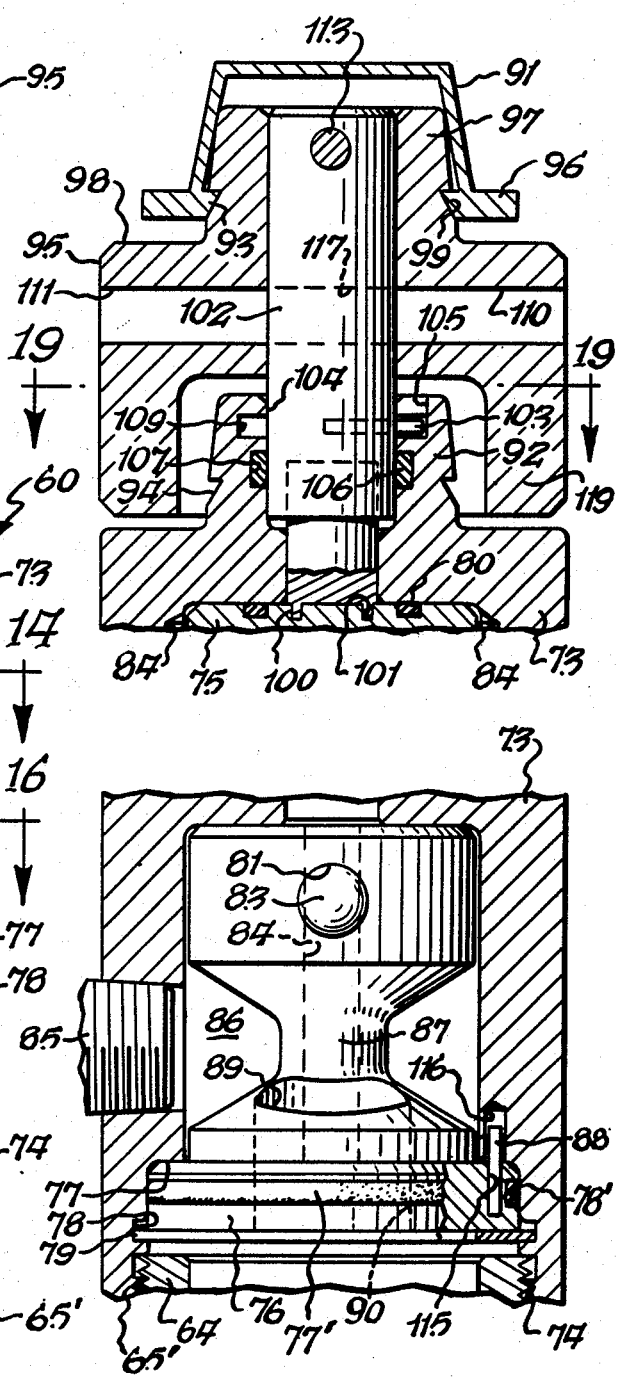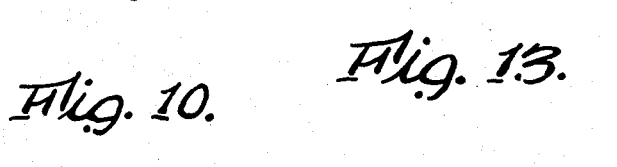

LOCKING VALVE CONSTRUCTION

This is a division of application Ser. No. 370,355, filed Apr. 21, 1982, now U.S. Pat. No. 4,495,910.

BACKGROUND OF THE INVENTION

The present invention relates to a locking valve construction of the type which can be opened only by means of a proper key and which cannot be demounted from a base member by the use of conventional tools.

By way of background, the theft of heavy equipment, such as bulldozers, graders, caterpiller tractors and other types of machinery, has become extremely prevalent. Equipment of this type can readily be started by merely turning on the ignition. It is with the providing of a locking valve which prevents fuel flow to the engines of such equipment that the present invention is concerned.

SUMMARY OF THE INVENTION

It is an object of the present invention to provide an improved locking valve construction which can be opened only by the use of a special key, thereby preventing fluid flow through the valve unless such a special key is used.

Another object of the present invention is to provide an improved locking valve construction which cannot be demounted from a base member on which it is mounted, except by special laboratory techniques, thereby precluding the demounting of the locking valve from its base member under field conditions. Other objects and attendant advantages of the present invention will readily be perceived hereafter.

The present invention relates to a locking valve construction comprising a housing, a valve member in said housing, a fluid inlet and a fluid outlet in said housing, key means for moving said valve member to an open position for selectively effecting communication between said fluid inlet and said fluid outlet, holding means on said housing for holding said housing against movement when said valve member is being moved relative to said housing by said key means, and means for permitting said housing and said valve member to move as a unit in the event said holding means is rendered inoperative to thereby prevent said valve member from moving relative to said housing to its open position.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view of the improved locking valve construction mounted on a fuel pump of the type secured to the block of a diesel engine;

FIG. 2 is a fragmentary end elevational view taken from the right of FIG. 1;

FIG. 2a is a fragmentary view taken substantially in the direction of arrows 2a—2a of FIG. 1;

FIG. 3 is a fragmentary cross sectional view taken substantially along line 3—3 of FIG. 2 and showing the various valve parts in assembled relationship;

FIG. 4 is an exploded view of the valve shown in FIG. 3 and also showing the valve key used to open and close the valve;

FIG. 10 is a fragmentary cross sectional view similar to FIG. 3 but showing a preferred embodiment of the present invention;

FIG. 11 is a fragmentary cross sectional view showing a valve key for opening and closing the valve of FIG. 10;

FIG. 12 is a fragmentary cross sectional view showing the valve key of FIG. 11 mounted on the valve of FIG. 10 and having a dust cover normally carried by the valve of FIG. 10 mounted thereon;

FIG. 13 is a fragmentary view, partially in cross section, taken along line 13—13 of FIG. 10 and showing the construction of the valve member and related portions of the housing;

DESCRIPTION OF THE PREFERRED EMBODIMENTS

Figure 5:
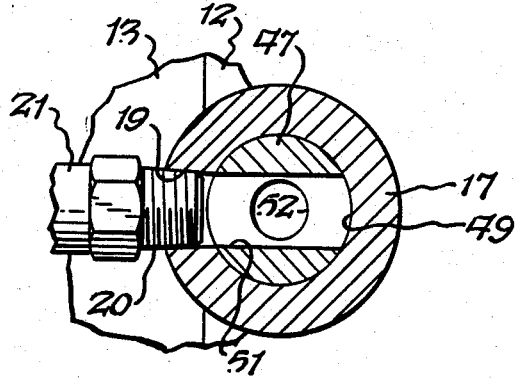
FIG. 5 is a fragmentary cross sectional view taken substantially along line 5—5 of FIG. 3 and showing the valve member within the housing in an open position.

One embodiment of the locking valve construction 10 is shown in FIGS. 1-9. Valve 10 is mounted on upper portion or neck 11 of injection plate 12 secured to fuel pump 13 by means of a plurality of bolts 14 and 15. Fuel pump 13, in turn, is bolted to the engine block 18 in the conventional manner. Bolts 14 are of the conventional hexagonal-head type. Each bolt 15 includes in its hardened frustoconical head an endless curved groove 16 which receives a special key having a ridge of a predetermined mating configuration, such as the type described in detail in U.S. Pat. No. 3,241,408, which is incorporated herein by reference. The heads of bolts 15 are frustoconical and their larger base is approximately 0.350 inches and their heads are about 0.115 inches high. Thus, they cannot be turned by conventional wrenches. Because of the structure of bolts 15, the injection plate 12 cannot be removed from fuel pump 13 unless a special key is used.

As noted briefly above, the theft of heavy equipment, such as bulldozers, graders and caterpiller tractors, has been a problem because these machines can be started simply. Valve 10 prevents such theft because it can be opened only by means of a special key, and because it cannot be removed from fuel pump 13 without destroying the pump.

Locking valve 10 includes a steel housing 17, which is preferably hardened, having a tapped bore 19 which receives the threaded portion 20 of fuel inlet conduit 21. Valve 10 is mounted on neck 11 of fuel pump injection plate 12 in the following manner. The threaded end 22 of nipple 23 is threaded into tapped bore 24 of neck 11 by means of a suitable wrench which is applied to diametrically opposed slots 26 at the upper end of nipple 23. An anaerobic thread locking coating 25 which has been applied to threaded portion 22 will become activated after the parts are assembled so that nipple 23 will be locked into neck 11. The anaerobic coating permits nipple 23 to be installed with relatively little torque, but after it has been activated by the lack of oxygen, the parts can only be separated by the application of an extremely high torque. An anaerobic coating which is satisfactory is known under the trademark DRI-LOC Formula 200, which is a product of Loctite Corporation. The anaerobic coating which is applied to other parts discussed hereafter is of the same type.

After nipple 23 has been installed as shown in FIG. 3, a sleeve member 27 is slid axially over nipple 23. The internal annular rim 29 of sleeve 27 will come to rest in the position shown in FIG. 3, wherein its lower surface 30 abuts upper surface 31 of neck 11, and O-ring 32 is positioned on smooth central portion 33 of nipple 23. In addition, key or holding member 34, which is cross sectionally in the shape of a chord (FIG. 7) and which is an integral part of sleeve 27, will assume the position shown in FIGS. 1, 3 and 7, with its flat surface 35 bearing against side 36 of neck 11. It will be appreciated that this relationship can be achieved only by sliding sleeve 27 in a rectilinear direction into the position shown in FIG. 3.

After sleeve 27 has been positioned in the foregoing manner, a locking nut 37 is threaded onto threads 39 at the upper end of nipple 23 until the lower side 40 of nut 37 bears on upper surface 41 of internal annular rim 29. An anaerobic locking compound 42 is located on the upper threads 39 of nipple 23 so that nut 37 can be tightened with relatively little torque, but cannot be removed without the application of excessive torque once the thread tightening compound has set. Nut 37 is installed by the use of a suitable spanner wrench which is received in diametrically opposed slots 43 in nut 37.

After nut 37 has been installed, housing 17 is threadably mounted by means of threads 47' on external threads 44 of sleeve 27. An anaerobic locking compound 45 is located on threads 44 so that when this compound sets, it will be virtually impossible to turn housing 17 relative to sleeve 27. Housing 17 is threaded onto sleeve 27 until its lower annular shoulder 46 bears on the upper surface 46' of sleeve 27.

Summarizing to this point, after the various areas of anaerobic locking compound set, lower threads 22 of nipple 23 will be locked to threads 24 of neck 11, the internal threads 38 of nut 37 will be locked to threads 39 of nipple 23, and the internal threads 47' of housing 17 will be locked to external threads 44 of sleeve 27. The torque required to turn the parts relative to each other after the anaerobic locking compound has been activated is approximately 200 foot pounds.

A valve member 47 is rotatably mounted within chamber 49 of housing 17 and is retained therein by means of a snap ring 50 located in groove 48. Bores 51 and 52 are located in valve member 47, so that when the latter is in the position shown in FIG. 3, there can be communication between fuel conduit 21 and nipple 23 so that fuel can flow to pump 13. This position is also shown in FIG. 5. However, when valve member 47 is turned to the position shown in FIG. 6, it will block flow of fuel between conduit 21 and nipple 23.

The valve member 47 includes an upper portion 50' which is secured to valve member lower portion 51' by means of roll pin 52'. Extension 50' includes a pair of bores 53' which receive the ends of spherical balls 54' which are spring-biased by springs 55' located in blind bores 56' of housing 17. O-rings 57', 58' and 59' are received in grooves 60', 61' and 62' to provide sealing engagement between valve member 47 and housing 17.

Figure 6:
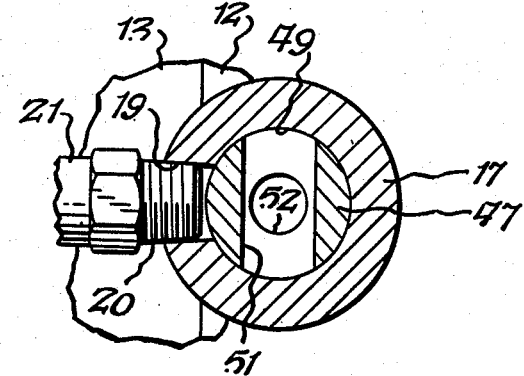
FIG. 6 is a fragmentary cross sectional view similar to FIG. 5 but showing the valve member in a closed position.
Figure 7:
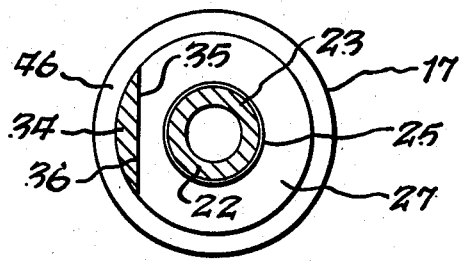
FIG. 7 is a cross sectional view taken substantially along line 7—7 of FIG. 3 and showing the key structure of the valve sleeve for preventing rotation of the sleeve relative to the fuel pump.
Figure 9:
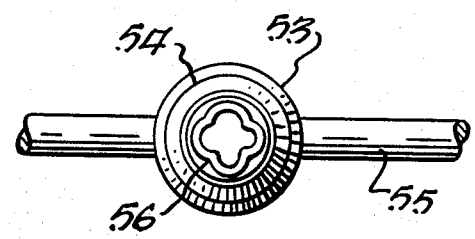
FIG. 9 is a fragmentary view taken substantially in the direction of arrows 9—9 of FIG. 4 and showing the male configuration on the valve key for mating engagement with the groove in the valve member.
Figure 8:
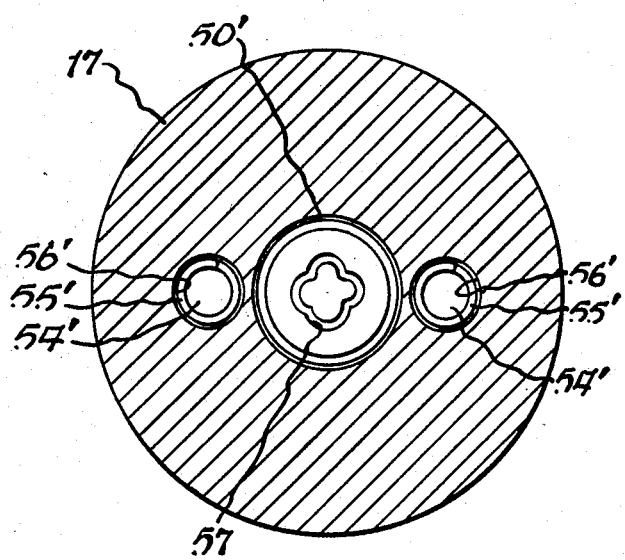
FIG. 8 is an enlarged cross sectional view taken substantially along line 8—8 of FIG. 3 and showing the endless female groove configuration on the valve member which receives the valve key.

In order to move valve member 47 between the positions of FIGS. 5 and 6, a valve key 53 is provided having a shank 54 and a handle 55. At the lower end of key 53 there is an endless ridge 56 (FIG. 9) of curvilinear shape without any sharp corners. The configuration of this ridge 56 may be in accordance with the teaching of U.S. Pat. No. 3,241,408, which, as noted above, is incorporated herein by reference. Ridge 56 is of complementary mating relationship to groove 57 in upper portion 50' of valve member 47 so that when ridge 56 is received in groove 57, valve member 47 can be turned between the positions of FIGS. 5 and 6 by the exertion of a proper turning torque which may be of the magnitude of between about 25 and 50 inch pounds. However, it will be appreciated that this torque is very much less than the torque which would be required to turn housing 17 which is held against turning by key or holding member 34, which will shear off at between 50–55 foot pounds, and the locking engagement between threads 44 and 47', which will not separate unless a torque of about 200 foot pounds is applied.

When the valve member 47 is in the full open position, the lower ends of balls 54' will be received in bores 53'. Suitable markings (not shown) are placed on the top of valve member portion 50' and on the top of housing 17 to show when the valve member 47 is in a full closed positon, that is, 90° removed from the position of FIG. 3.

It will be appreciated that the only way that valve member 47 can be turned is by the use of a suitable key, such as 53. It will further be appreciated that there are an infinite number of configurations for ridge 56 and groove 57, as described in detail in the above U.S. Pat. No. 3,241,408, so that the key and groove will not be of a standard configuration, and thus every valve may require a key of its own specific configuration.

Since valve member 47 can only be turned by a special key, a thief may attempt to remove locking valve 10 from neck 11 of pump injection plate 12 so that a connection can be made between inlet fuel line 21 and the pump. One way of attempting this would be by applying a wrench to housing 17. If sufficient torque is applied to turn housing 17, key 34 on sleeve 27 will break off before the lower threaded portion 22 of nipple 23 can be turned and before the housing 17 can be turned relative to sleeve 27. In this respect, key 34 will shear off at between about 50 to 55 foot pounds whereas the parts which are locked to each other by anaerobic locking compound will not separate until about 200 foot pounds of torque are exerted, as discussed above. After key 34 breaks off, housing 17 and sleeve 27, which is locked thereto, can be rotated only as a unit about the central portion 33 of nipple 23, but no separation of housing 17 from nipple 23 can be effected because lock nut 37 is locked to the upper end of nipple 23 by means of the anaerobic locking compound, and the nipple is locked to neck 11 with anaerobic locking compound. The holding force between nipple 22 and neck 11 and nut 37 is greater than the force resisting turning of sleeve 27 about nipple 22. Therefore, no matter how much housing 17 is turned, valve member 47 will turn with it in the closed position and therefore access cannot be had to the inlet conduit 24 of injection plate 12. If a hammer is used to attempt to knock valve 10 off of neck 11, the tight connection between valve 10 and neck 11, as described above, will result in the destruction of injection plate 12, thereby rendering the pump 13 useless for pumping fuel into engine block 18.

It can thus be appreciated that unauthorized opening of valve 10 is virtually impossible. However, if the valve is to be demounted from injection plate 12 for servicing, injection pump 12 and valve 10 must be demounted as a unit from pump 13 by unscrewing bolts 14 and 15. As noted above, bolts 15 can only be unscrewed by a special key. Thereafter, the assembly is placed in an oven at about 500° F. for approximately one hour to deactivate the anaerobic locking compound, after which the locking valve 10 can be disassembled by applying relatively low torques.

In FIGS. 10-19 a preferred embodiment of the present invention is disclosed. The locking valve 60 operates on the same general principles as valve 10 of FIGS. 1-9. A nipple 61 is provided having a lower threaded end 62 which is received in tapped portion 63 of injection plate neck 11 with anaerobic locking compound 63' therebetween. A sleeve 64 having an internal annular rim 65 is rectilinearly slid onto nipple 61 so that surface 66 of the sleeve is in contiguous relationship to central surface 67 of nipple 61 with an O-ring 69 therebetween and with a key 70, which is analogous to key 34, mounted on neck 11, as described above. A nut 71 bears downwardly on internal annular rim 65 after being threaded onto threads 72 of nipple 61, with anaerobic locking compound 64' therebetween. A valve housing 73, which is preferably hardened, is threadably mounted on threads 74 of sleeve 64 with anaerobic locking compound 65' therebetween. Up to this point, the structure of valve 60 is identical to the structure described above relative to FIGS. 1-9.

A valve member 75 is housed within housing 73 and is retained therein by a cylindrical valve seat 76 having its outer portions bearing against annular shoulder 77 of housing 73 and being retained in position by means of a snap ring 79 located in groove 78. Valve seat 76 is restrained from turning by a pin 88 (FIG. 13) which is held in a bore 115 in seat 76 and a bore 116 in housing 73. Valve seat 76 includes an O-ring 77' in groove 78' to provide sealing with housing 73. Valve member 75 has an O-ring 80 mounted in a groove (not numbered) so as to provide a fluid-tight seal between the upper portion of valve member 75 and the adjacent portion of housing 73.

A bore 81 is located in the upper portion of valve member 75 and receives a coil spring 82. Spherical balls 83 are received in bore 81 and are biased outwardly by spring 82. Balls 83 will be located in arcuate grooves 84 of housing 73 in both the fully opened position of valve member 75 and the fully closed position thereof. In this respect, in FIGS. 10 and 14 valve member 75 is shown in the closed position. Thus, fuel from inlet conduit 85 may enter annular chamber 86 surrounding the central portion 87 of valve member 75, and the fuel may also enter arcuate duct 89, but in view of the position of valve member 75, the fuel cannot enter arcuate duct 90 in valve seat 76.

Figure 14:
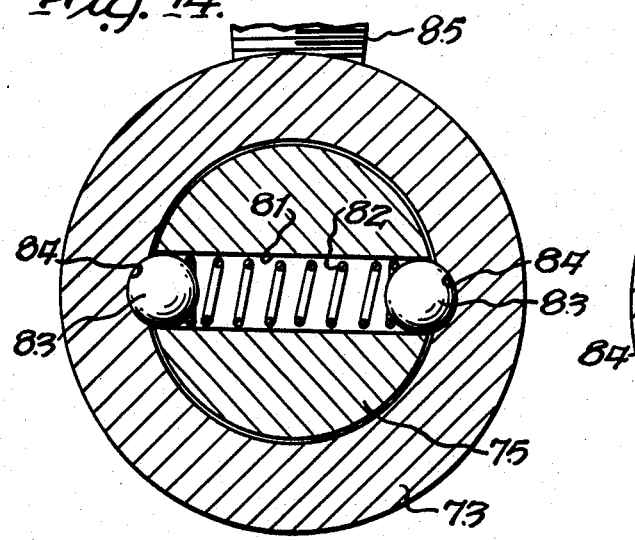
FIG. 14 is a fragmentary cross sectional view taken substantially along line 14—14 of FIG. 10 and showing the valve member within the housing in a closed position.
Figure 15:
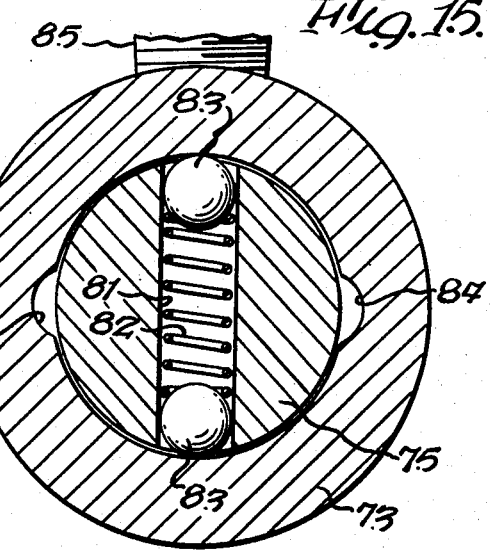
FIG. 15 is a view similar to FIG. 14 but showing the valve member rotated 90° from its closed position.
Figure 16:
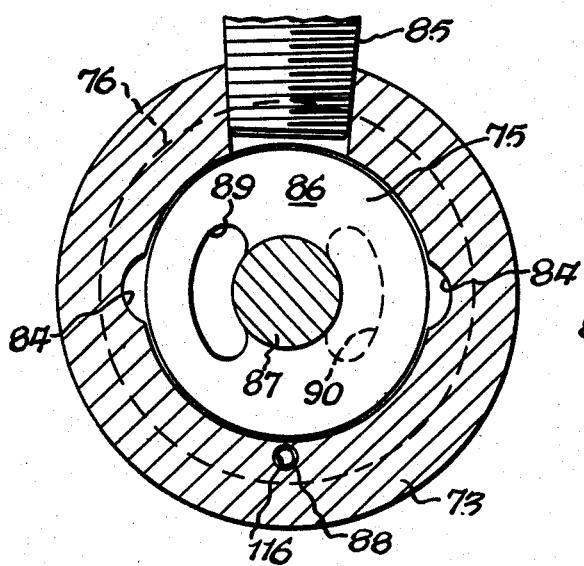
FIG. 16 is a fragmentary cross sectional view taken substantially along line 16—16 of FIG. 10 and showing the valve member in a closed position corresponding to the position of FIG. 14.
Figure 17:
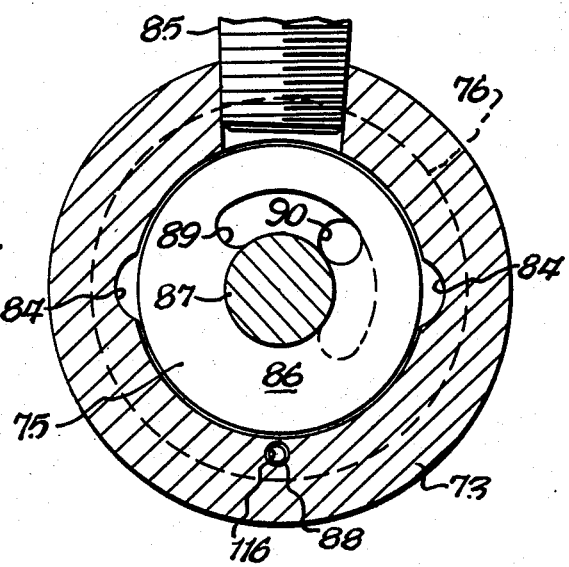
FIG. 17 is a fragmentary cross sectional view similar to FIG. 16 and showing the valve member in a partially open position corresponding to the position of FIG. 15.
Figure 18:
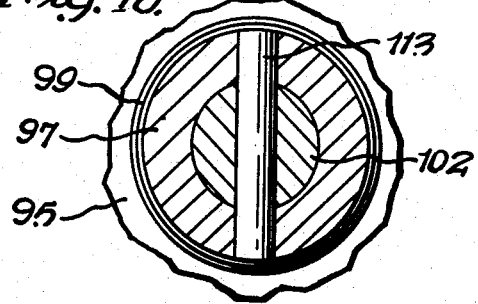
FIG. 18 is a fragmentary cross sectional view taken substantially along line 18—18 of FIG. 11 and showing this portion of the valve key structure.
Figure 19:
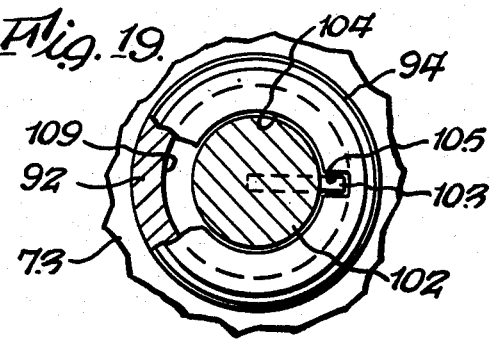
FIG. 19 is a fragmentary cross sectional view taken substantially along line 19—19 of FIG. 12 and showing the structure for permitting the valve key to enter into locking engagement with the valve member and for retaining it on the valves after it is turned.

In order to have fuel flow from inlet conduit 85 into nipple 61, valve member 75 has to be turned approximately 90° from the position shown in FIGS. 10 and 14 to the position shown in FIGS. 15 and 17. However, when the valve member 75 is in the fully opened position, it will be 180° removed from the position shown in FIG. 10. The turning is effected by a suitable valve key analogous to key 53 of FIG. 4, which will be described in greater detail hereafter. However, insofar as pertinent here, it is to be noted that the torque required to move valve member 75 out of the position shown in FIG. 10 will be determined by the frictional engagement between this valve member and the adjacent parts of the valve and also by the force of spring 82 bearing outwardly on balls 83.

When the valve key 95 is not inserted into valve housing 73, a dust cover 91 is mounted on neck 92 at the upper end of housing 73 by means of a snap fit between annular rim 93 and notched annular groove 94. Prior to inserting key 95 into housing 73, dust cover 91 must be removed by applying upward pressure on annular rim 96. After it is removed, it can be slipped onto the upper neck portion 97 of key 95 until internal annular ridge 93 snaps into groove 99 (FIG. 12). Key 95 includes a ridge 100 of the type shown in FIG. 9 which is received in a mating groove 101 of the type shown in FIG. 8. As noted above, the ridge and groove are of the type shown in U.S. Pat. No. 3,241,408, which has been incorporated herein by reference. Ridge 100 is located at the lower end of shank 102 which has a pin 103 extending radially outwardly therefrom. In order to insert shank 102 into opening 104 in neck 92 of housing 73, pin 103 has to be aligned with groove 105 (FIG. 19) in neck 92, and the lower end of key 95 can thereafter be slipped downwardly past 0-ring 106 located in groove 107. Thereafter, shank 102 can be rotated by manipulating handle or knob 98. Pin 103 will move into annular groove 109 so that key 102 cannot be removed again until pin 103 is in alignment with slot 105 when the valve member 75 is in a closed position. The relationship between pin 103 and slot 105 will enhance the entry of ridge 100 into groove 101 because in the closed position of valve member 75, ridge 100 will be in alignment with groove 101 when pin 103 is aligned in slot 105.

Ordinarily key 95 can be turned by manually grasping cylindrical handle or knob 98. However, if for any reason more torque must be used than can be manually applied to knob 98, a pin (not shown) of suitable strength may be inserted through bores 110 and 111 on opposite sides of knob 98 and bore 117 in shank 102 in alignment therewith. Knob 98 is attached to shank 102 by means of a pin 113. A cylindrical skirt 119 extends downwardly from the upper portion of knob 98 and surrounds the upper portion 92 of the valve housing to act as a dust guard.

It will be appreciated that valve 60 operates in the same basic manner as valve 10 insofar as its anti-theft qualities. However, it is improved over valve 10 because the key is retained in locked condition in the valve body unless the valve member 75 is moved to a full off position. In addition, if an attempt is made to bypass valve 10 by drilling a hole through housing 73, this procedure will be ineffective because the only way fuel can flow to nipple 61 is through arcuate slots 89 and 90.

By way of dimensions, the housing is approximately 3 inches long and 1½ inches in diameter, and the remainder of the parts are drawn to scale.

While the locking valves of the present invention have been described relative to a fuel pump, it will be appreciated that they can be used in any other environment where fluid flow is to be controlled.

It can thus be seen that the improved locking valves of the present invention are manifestly capable of achieving the above enumerated objects, and while preferred embodiments of the present invention have been disclosed, it will be appreciated that it is not limited thereto, but may be otherwise embodied within the scope of the following claims.

What is claimed is:

1. A locking valve construction comprising a housing, a valve member in said housing, a fluid inlet and a fluid outlet in said housing, key means for moving said valve member to an open position for selectively effecting communication between said fluid inlet and said fluid outlet, holding means on said housing for holding said housing against movement when said valve member is being moved relative to said housing by said key means, and means for permitting said housing and said valve member to move as a unit in the event said holding means is rendered inoperative to thereby prevent said valve member from moving relative to said housing to its open position.

2. A locking valve construction as set forth in claim 1 wherein said holding means holds said housing against rotation, and wherein said valve means is rotatably mounted in said housing, and wherein said key means includes means for rotating said valve means.

3. A locking valve construction comprising a nipple having a first end mounted on a base member and a second end remote from said first end and a central portion between said first and second ends, a sleeve having an annular internal rim in contiguous relationship to said central portion, holding means on said sleeve for locking engagement with said base member, a lock nut mounted in locking engagement with said second end of said nipple and in effective bearing engagement with said annular internal rim for retaining said sleeve in position on said base member, a valve housing mounted in locking engagement on said sleeve, a fluid inlet in said valve housing, a valve member in said valve housing for selectively effecting communication between said fluid inlet and said nipple, and key receiving means in said valve member for receiving a valve member moving key for turning said valve member, said valve member being movable relative to said housing by said valve member moving key to selectively effect said communication when said holding means restrains said sleeve against rotation relative to said base member and said valve member moving with said housing when said holding means does not restrain said sleeve against said rotation.

4. A locking valve construction as set forth in claim 3 wherein said central portion comprises a first surface and said internal annular rim includes a second surface which is rotatably slidable relative to said first surface.

5. A locking valve construction as set forth in claim 4 including O-ring means between said first and second surfaces.

6. A locking valve construction as set forth in claim 3 wherein said holding means comprises a lip for locking engagement with said base member.

7. A locking valve construction as set forth in claim 3 including detent means between said valve member and said housing for locating open and closed positions of said valve member.

8. A locking valve construction as set forth in claim 3 wherein said first and second ends of said nipple are threaded and wherein said first end is threaded into said base member, and anaerobic locking compound on said first and second ends of said nipple for effecting said locking engagement between said nipple and said base member and between said nipple and said lock nut.

9. A locking valve construction as set forth in claim 3 including first threads on said sleeve and second threads on said housing for mating engagement with said first threads, and anaerobic locking compound between said first and second threads.

10. A locking valve construction as set forth in claim 3 including detent means in said valve member for locating said valve member in a closed position.

11. A locking valve construction as set forth in claim 10 wherein said detent means comprises a biased ball detent.

12. A locking valve construction as set forth in claim 3 including a valve member moving key, a pin extending radially from said valve member moving key, a slot extending axially in said housing for receiving said pin, and a groove in said housing for locking said pin in said housing when said valve member moving key is rotated away from said slot.

13. A locking valve construction as set forth in claim 3 including a seat in said housing between said valve member and said nipple for retaining said valve member in said housing.

14. A locking valve construction as set forth in claim 13 including means for removably mounting said seat in said housing.

15. A valve construction comprising a housing, a valve member in said housing, a fluid inlet and a fluid outlet in said housing, moving means for moving said valve member to an open position for selectively effecting communication between said fluid inlet and said fluid outlet, holding means on said housing for holding said housing against movement when said valve member is being moved relative to said housing to an open position by said moving means, and means for permitting said housing and said valve member to move as a unit in the event said holding means is rendered inoperative to thereby prevent said valve member from moving relative to said housing to its open position.

16. A valve construction as set forth in claim 15 wherein said holding means holds said housing against rotation, and wherein said valve means is rotatably mounted in said housing, and wherein said moving means includes key means for rotating said valve means.

17. A locking valve construction comprising a housing, a valve member in said housing, a fluid inlet and a fluid outlet in said housing, first means for holding said valve member with a first force against movement within said housing to an open position between said fluid inlet and said fluid outlet, second means on said housing for holding said housing against movement on a base member with a second force which is larger than said first force, means for permitting said housing and said valve member to move as a unit relative to said base member in the event said second means is rendered inoperative as a result of a force in excess of said second force being applied to said housing, and third means for locking said housing to said base member with a third force sufficient to cause said housing to remain mounted on said base member when said housing and said valve member move as a unit when said second means is rendered inoperative.

18. A locking valve construction as set forth in claim 17 wherein said third force is larger than said second force.

19. A locking valve construction as set forth in claim 17 wherein said second means holds said housing against rotation, and wherein said valve means is rotatably mounted in said housing, and wherein said first means includes means for rotating said valve means.

* * * * *